United States Patent
Schininger et al.

(10) Patent No.: US 9,200,153 B2
(45) Date of Patent: Dec. 1, 2015

(54) COMPOSITION

(75) Inventors: Renate Schininger, Linz (AT); Claudia Kniesel, Linz (AT)

(73) Assignee: Borealis AG, Vienna (AT)

( * ) Notice: Subject to any disclaimer, the term of this patent is extended or adjusted under 35 U.S.C. 154(b) by 139 days.

(21) Appl. No.: 13/698,838

(22) PCT Filed: May 19, 2011

(86) PCT No.: PCT/EP2011/058169
§ 371 (c)(1),
(2), (4) Date: Jan. 31, 2013

(87) PCT Pub. No.: WO2011/144703
PCT Pub. Date: Nov. 24, 2011

(65) Prior Publication Data
US 2013/0203930 A1 Aug. 8, 2013

(30) Foreign Application Priority Data

May 21, 2010 (EP) .................................... 10163618

(51) Int. Cl.
| | |
|---|---|
| C08K 3/40 | (2006.01) |
| C08L 33/08 | (2006.01) |
| C08L 33/12 | (2006.01) |
| C08L 23/08 | (2006.01) |
| C08L 23/10 | (2006.01) |

(52) U.S. Cl.
CPC ............. *C08L 33/08* (2013.01); *C08L 23/0869* (2013.01); *C08L 23/10* (2013.01)

(58) Field of Classification Search
CPC ......... C08L 23/10; C08L 23/12; C08L 23/14; C08L 23/16; C08L 23/0869; C08L 33/08; C08L 33/10; C08L 33/12

USPC .................................................. 524/494, 523
See application file for complete search history.

(56) References Cited

U.S. PATENT DOCUMENTS

| | | | |
|---|---|---|---|
| 4,868,226 A * | 9/1989 | Mitsuno et al. | ................ 523/212 |
| 5,532,066 A | 7/1996 | Latiolais et al. | |
| 2007/0049682 A1 | 3/2007 | Walsh | |
| 2007/0066758 A1 | 3/2007 | McArdle et al. | |
| 2008/0306198 A1 * | 12/2008 | Zucchelli et al. | ............. 524/394 |

FOREIGN PATENT DOCUMENTS

| | | |
|---|---|---|
| CN | 101412830 A | 4/2009 |
| EP | 1357144 A1 | 10/2003 |
| EP | 2154207 A1 | 2/2010 |
| JP | 2006321914 A | 11/2006 |
| WO | 2005/087848 A2 | 9/2005 |
| WO | 2007/025663 A1 | 3/2007 |
| WO | 2009/065589 A1 | 5/2009 |

OTHER PUBLICATIONS

Gururajan et al., Effect of Poly(ethylene methyl acrylate) Copolymer on Thermal, Morphological, and Mechanical Properties of Polypropylene Copolymer Blown Films, J. of Applied Polymer Science, 107:2500-2508 (2008).
International Search Report and Written Opinion for Application No. PCT/EP2011/058169 dated Jun. 22, 2011.

* cited by examiner

*Primary Examiner* — David W Wu
*Assistant Examiner* — Marie Reddick
(74) *Attorney, Agent, or Firm* — Meunier Carlin & Curfman LLC

(57) ABSTRACT

A composition comprising: (I) 30 to 85 wt % of a polypropylene component comprising a polypropylene copolymer; (II) 5 to 49 wt % of a second component comprising at least one ethylene alkyl (meth)acrylate polymer having a (meth)acrylate content of at least 15 wt %; and (III) 10 to 50 wt % of glass fibers.

10 Claims, No Drawings

COMPOSITION

This invention relates to a new composition for use in injection moulded articles showing excellent scratch resistance whilst also having ideal mechanical properties. In particular, the invention relates to a polypropylene copolymer having added thereto at least one ethylene alkyl (meth)acrylate polymer. This combination has been surprisingly found to minimise scratching whilst maintaining excellent mechanical properties and haptic properties.

Polypropylene resins are widely used to form a variety of useful materials due to their advantageous properties. Polypropylene resins are well suited for producing flexible structures such as body parts for automotive applications, which include exterior parts such as bumpers, air dams and other trim and interior parts such as dash boards, airbag covers and the like.

Reinforced polypropylenes have gained relevance in fields previously relying on non-polymeric materials, such as metals. One particular example of reinforced polypropylenes are glass fibre reinforced polypropylenes. Such materials enable tailoring of the properties of the composition by selecting the type of polypropylene, the amount of glass fibre and the type of coupling agent used.

It is also common practice to use all kind of fillers in order to enhance or fine-tune the property profile of polymers. A common filler for polyolefins is talc. This compound is used mainly due to its good cost-benefit ratio as it gives acceptable properties at very low cost. However, whilst talc usually improves the stiffness of a composition, it also has some negative effects on other properties. For example, the addition of talc in general increases the visibility of scratches. Talc is white making scratches very obvious.

Polypropylene reinforced with glass fibres is, in general, particularly susceptible to scratching. The combination of glass fibres and polypropylene can exacerbate this problem. For injection moulded parts like car parts, it is important that the part is scratch resistant and that any scratches which do occur are of very low visibility.

There is no desire to stop using polypropylenes as they offer such valuable properties but there is a need to deal with the issue of scratching and hence to improve scratch resistance.

A common solution today is the use of an HDPE additive or a slip agent to reduce scratching. It is very important however that any additive used to reduce minimise scratching or at least the visibility therefore does not detrimentally affect other properties such as mechanical properties. The additive must also be compatible with the other polymers present and other components such as reinforcing glass fibres.

Slip agents such as fatty acid amides which are currently used in scratch prevention are known to cause odour and fogging issues in the final part and may cause stickiness. The addition of an HDPE, a typically highly crystalline polymer material increases gloss, which is not preferred in this field.

The present inventors have realised that the addition of an ethylene alkyl (meth)acrylate copolymer (EAA) to a polypropylene polymer in particular amounts provides a composition with excellent scratch resistance. The finding that these acrylate polymers can provide polypropylenes with excellent scratch resistance is new. It has also been found that this combination of polypropylene and EAA gives rise to a composition which, when moulded into the desired part, provides improved haptic performance, in particular in that the touch and feel of the part is perceived as superior to other combinations. Finally, the mechanical properties of the composition are retained. In particular the tensile, impact and flexural properties of the composition are similar to that of the polypropylene alone.

It is envisaged therefore that the use of an EAA might allow the elimination of fatty acid amides (i.e. slip agents) from these polymer compositions. These additives are often added to improve the scratch resistance of a material where their positive effect is based on migration of the molecules to the surface where they reduce the coefficient of friction. The main drawback of these additives is that they may increase the stickiness of the surface and also negatively influence the taste and odour and fogging properties of the material.

The combination of polypropylene with an EAA is not new. US2007/0066758 describes the combination of an anhydride modified polypropylene, a conventional polypropylene and an EAA. The blend is for use in combination with glass fibres. The idea is that the combination of anhydride modified polypropylene and EAA can provide a masterbatch for modifying a polypropylene resin.

In US2007/0049682, EAA forms the major component in a mixture containing a polypropylene. A scratch improving additive is also added clearly suggesting that the inventors had no appreciation of the value of EAA itself at preventing scratches.

In J Appl Polym Sci, Vol 107, 2500-2508, Gururajan et al investigate the effects of ethylene methyl acrylate on the properties of blown films formed from polypropylene copolymers.

The present inventors have found that the combination of relatively low amounts of EAA with an elastomeric polypropylene polymer gives rise to a blend with ideal properties for injection moulding. This composition is ideally suited for use with reinforcing agents such as glass fibres to provide a composition suitable for use in, for example, car part manufacture. The mechanical and haptic properties of the blend are excellent.

Thus, viewed from one aspect the invention provides a composition comprising:
(I) 30 to 90 wt %, preferably 30 to 85 wt % of a polypropylene component comprising a polypropylene copolymer;
(II) 5 to 49 wt % of a second component comprising at least one ethylene alkyl (meth)acrylate polymer having a (meth)acrylate content of at least 15 wt %; and
(III) 0 to 50 wt %, preferably 10 to 50 wt % of glass fibres.

Viewed from another aspect the invention provides a moulded article, especially an injection moulded article comprising a composition as hereinbefore defined.

Viewed from another aspect the invention provides a process for making a composition as hereinbefore defined comprising obtaining a first component (I) as hereinbefore defined and blending said first component with said second component and optionally said third component.

Viewed from another aspect the invention provides use of a composition as hereinbefore defined in injection moulding.

DETAILED DESCRIPTION OF THE INVENTION

Ethylene Alkyl (meth)acrylate Resin (EAA)

The composition of the invention comprises at least one ethylene alkyl (meth)acrylate resin. The term (meth)acrylate is intended to cover both methacrylates and acrylates, i.e. compounds of formula $CH_3-CH_2=CHCOO-$ or $CH_2=CHCOO-$. The (meth) designates therefore the optional presence of the methyl group forming the methacrylate. It is preferred, however, if the EAA of the invention is an acrylate.

The term "alkyl" is used to designate a $C_{1-6}$ alkyl, preferably a $C_{1-4}$ alkyl. Preferably the EAA may be an ethylene methyl (meth)acrylate, ethylene ethyl (meth)acrylate or ethylene butyl (meth)acrylate resin, especially ethylene methyl acrylate, ethylene ethyl acrylate or ethylene butyl acrylate resin (EMA, EEA and EBA respectively). Whilst mixtures of these resins can be used, it is preferred if only one EAA is used. Most preferably this is EMA.

The amount of (meth)acrylate (relative to the amount of ethylene) in the EAA resin can vary over wide limits. It is preferred if there is an excess of ethylene present. Typical values range from 15 to 40 wt % of the acrylate, such as 15 to 35 wt % of the acrylate in the EAA polymer. We have surprisingly found that improvements in shrinkage properties can be achieved by using higher acrylate contents in the EAA polymer, e.g. 20 to 35 wt % acrylate, e.g. 25 to 35 wt %.

The density of the ethylene alkyl (meth)acrylate resin may be in the range of 935 to 960 kg/m$^3$. Its $MFR_2$/190° C. may range from 0.1 to 20 g/10 min.

The amount of ethylene alkyl (meth)acrylate resin employed in the composition of the invention may be from 5 to 49 wt %, such as 10 to 45 wt %, preferably 15 to 45 wt % of the composition. It has been surprisingly found that even at slightly lower EAA contents, e.g. 5 to 30 wt %, preferably 10 to 25 wt %, excellent scratch resistance properties can still be achieved without damaging mechanical properties of the composition.

These EAA polymers are commercially available materials and can be purchased from various suppliers, e.g. under the trade name ELVALOY™.

Polypropylene

The polypropylene component of the invention comprises a polypropylene copolymer. The copolymer preferably has the property of viscoelasticity.

Preferably, the polypropylene component is a heterophasic polypropylene copolymer. Such a polymer comprises at least two components, a matrix component and a dispersed phase component (i.e. an elastomer component). Elastomers are amorphous polymers existing above their glass transition temperature.

Polypropylene copolymers of use in the invention are commercially available products available from suppliers such as Borealis. Suitable copolymers are sold under the trade name SD233CF by Borealis.

There should preferably be at least 35 wt % of the polypropylene component in the composition of the invention. Ideally, the polypropylene component forms at least 40 wt % of the composition, especially at least 50 wt %. The polypropylene component should be the largest component of the composition as a whole. There may be up to 90 wt %, such as up to 85 wt % of the polypropylene component, such as up to 80 wt %, preferably up to 75 wt %, e.g. up to 70 wt % of the polypropylene component. A preferred range is 35 to 65 wt %. It will be appreciated that once the amount of glass fibres and EAA component is fixed, the amount of the polypropylene component can represent the rest of the composition (i.e. to make up to 100 wt %). Typically of course, there will be additives and potentially other components present which mean that the amount of polypropylene component reduces accordingly.

Ideally, the polypropylene component of the invention comprises a propylene ethylene copolymer.

The ethylene content in polypropylene component of the invention is preferably at least 5 wt %, e.g. 5 to 30 wt %, preferably 5 to 15 wt %.

The $MFR_2$ of the polypropylene component may be in the range 0.01 to 300 g/10 min, preferably 1 to 20 g/10 min, especially 5 to 15 g/10 min. The density of the polypropylene component is typically around 0.900 g/cm$^3$. It may range from 0.890 to 0.910 g/cm$^3$. Xylene solubles are preferably in the range of 15 to 30, preferably 20 to 25 wt %.

Preferably, the polypropylene component is a heterophasic polypropylene copolymer. Such a polymer comprises at least two components, a matrix component and a dispersed phase component (i.e. an elastomer component).

The heterophasic polypropylene to be employed in accordance with the present invention may thus comprise a matrix phase comprising only one propylene polymer component or the matrix phase may comprise more than one propylene polymer, such as two, three or four different propylene polymers. In preferred embodiments, the matrix phase comprises one propylene polymer component or two propylene components, preferably one component.

The matrix phase usually comprises at least one propylene homopolymer and/or a propylene copolymer. In one embodiment the matrix component is formed from a propylene homopolymer. Alternatively, the matrix component can be formed from a polypropylene copolymer with at least one comonomer, e.g. ethylene.

Preferably, the matrix phase comprises at least two propylene polymer components, preferably either (i) a propylene homopolymer or a propylene random copolymer in combination with (ii) a propylene random copolymer.

The propylene polymer components for the matrix phase are preferably combined by preparing the matrix phase as in-situ reactor blend, i.e. by preparing the different components of the matrix phase during subsequent polymerization steps in suitable reactor arrangements.

By the term "random copolymer" is meant herein that the comonomer in said copolymer is distributed randomly, i.e. by statistical insertion of the comonomer units, within the copolymer chain. Said term "random" copolymer is generally known and used in the art.

The term "comonomer" is defined herein as the types of monomers present in the heterophasic polypropylene composition other than propylene. Preferred comonomers are ethylene and C4-C8 alpha-olefins.

The matrix phase of the heterophasic polypropylene may comprise up to 10 Wt % of ethylene and/or at least one C4-C8 alpha-olefin, preferably ethylene, typically 1 to 7 wt %, and in embodiments 2 to 5 wt %. In accordance with the present invention, the matrix phase of the heterophasic polypropylene, however, may also be a homopolymer, wherein the term "homopolymer" also comprises embodiments wherein minor amounts of less than 0.1 wt % of comonomers are present, wherein the comonomers are selected among those identified above.

The matrix phase of the heterophasic polypropylene may be unimodal or multimodal, i.e. the different components of the matrix phase may either show similar molecular weight distributions or different molecular weight distributions (and accordingly also MFR2 values).

The matrix phase in accordance with the present invention preferably shows an $MFR_2$ (ISO 1133, at 230° C. 2,16 kg load) of from 0.5 to 100 g/10 min, such as from 2 to 50 g/10 min and in embodiments from 5 to 20 g/10 min.

The matrix phase may form up to 90 wt % of the propylene copolymer component.

The overall $MFR_2$ (ISO 1133, at 230° C., 2,16 kg load) of the heterophasic composition typically is from of from 2 to 25 g/10 min, such as from 5 to 20 g/10 min and in embodiments from 5 to 15 g/10 min.

Most preferably the matrix component is a random propylene ethylene copolymer or mixture of random propylene ethylene copolymers.

Dispersed Phase

The dispersed phase, i.e. the elastomeric rubber phase comprises at least one, e.g. two suitable elastomeric copolymers. This dispersed phase (rubber phase) may form up to 45 wt % of the total weight of the heterophasic polypropylene. Suitable ranges are 10 to 40 wt % and in embodiments also 10 to 20 wt %.

The dispersed phase comprises at least one elastomeric copolymer of propylene and one or more olefin comonomers, preferably ethylene. The rubber phase comprises from 5 to 50 wt % of olefin comonomer, preferably ethylene. The rubber phase comprises preferably a high amount of comonomer, preferably 5 to 40-wt %, more preferably 7 to 35-wt %.

Examples of olefin comonomers, in addition to the preferred ethylene, are C4-C8 alpha-olefins. According to a preferred embodiment of the present invention, the dispersed phase, i.e. the ethylene rubber copolymer is an ethylene propylene rubber (EPR). EPR materials are more cost-effective than rubbers with higher alpha-olefins and they can be synthesized in a final step of a multi-step process, where the first steps synthesize the matrix polymer.

In one embodiment, the dispersed phase may comprise at least two elastomeric components, e.g. as described in WO2009/065589.

Most preferably the dispersed phase component is a random propylene ethylene copolymer.

The heterophasic polypropylene copolymers of the invention may be produced in a multistage process as is known in the art. That process may involve the combination of at least one slurry and at least one gas phase reactor connected directly together in series.

The slurry phase polymerisation may be carried out at temperatures of lower than 75° C., preferably 60-65° C. and pressures varying between 30-90 bar, preferably 30-70 bar. The polymerization is preferably carried out in such conditions that 20-90 wt %, preferably 40-80 wt % from the polymer is polymerized in the slurry reactor or reactors. The residence time can be between 15 and 120 min.

The gas phase polymerization step is carried out by transferring the reaction mixture from the slurry phase directly to the gas phase without removing unreacted monomers. The pressure is preferably higher than 10 bars. The reaction temperature used will generally be in the range 60 to 115° C., preferably 70 to 110° C. The reactor pressure will be higher than 5 bars, and preferably be in the range 10 to 25 bar, and the residence time will generally be 0.1 to 5 hours. Since unreacted monomers from the slurry phase are transferred into the gas phase it is important to establish how much unreacted monomer has been transferred to allow ready determination of how much further monomer to add to the gas phase. Such measurements can be achieved by simple gas chromatography allowing maintenance of appropriate comonomer concentrations.

The liquid medium from the first stage reactor can function as a cooling medium of the fluid bed in the gas phase reactor, when evaporating therein.

Polymerisation may be achieved using any standard olefin polymerisation catalyst and these are well known to the person skilled in the art. Preferred catalyst systems comprise an ordinary stereospecific Ziegler Natta catalyst, metallocene catalysts and other organometallic or coordination catalysts. A particularly preferred catalyst system is a high yield Ziegler-Natta catalyst having a catalyst component, a cocatalyst component, optionally an external donor. The catalyst system may thus contain a titanium compound and an electron-donor compound supported on an activated magnesium dichloride, a trialkylaluminium compound as activator and an electron donor compound.

Heterophasic polypropylene copolymers are well known commercial products and can be purchased from suppliers. Processes for making them are well known.

Glass Fibres

The composition in accordance with the present invention may also comprise glass fibers in an amount of from 0 to 50 wt %, preferably 10 to 50-wt %, preferably from 10 to 40 wt %, e.g. 15 to 35 wt %. The glass fibers may be selected form short cut or long (endless) glass fibers but typically the glass fibers are cut fibers having a length, prior to compounding with the polypropylene, of several millimeters, such as from 3 to 15 mm or longer, preferably 3.5 to 5 mm. Glass fibers of this type are commercially available and examples thereof are the trade designations P968 of OCV, T480 of NEG, THERMOFLOW™ 738 by Johns Manville or others.

Typically the glass fibers have a diameter of about 10 to 15 µm although also other diameters for glass fibers are contemplated in accordance with the present invention.

The composition in accordance with the present invention may also include a coupling agent for improving the coupling of the glass fibers in the polymer matrix. Any type of coupling agent may be used and illustrative examples thereof are maleic anhydride grafted propylene homopolymers or propylene-ethylene block-copolymers as well as POLYBOND 3150/3200 of Chemtura, EPOLENE™ G3003 of Eastman and EXXEL™ or PO1015 or PO1020 of Exxon. Amounts of coupling agents depend from the type and amount of glass fibers but typically a coupling agent is added in an amount of from 0.5 to 5-wt % based on the weight of the composition.

In a highly preferred embodiment, no coupling agent is employed.

Additional Components

The compositions may also comprise further polyolefinic components to enhance the properties of the composition. For example, the addition of HDPE, LDPE or LLDPE is contemplated. In addition, the option of adding further elastomeric polymers is envisaged.

Thus, the composition of the invention may contain an HDPE, in particular one having a density of at least 940 kg/m$^3$, e.g. 940 to 980 kg/m$^3$. Such a polymer is preferably an ethylene homopolymer. Alternatively, an LLDPE or an LDPE may be present, e.g. having a density between 905 and 935 kg/m$^3$. Such a polymer might be present in an amount of up to 15 wt %, such as up to 10 wt % of the composition.

It is also possible to add further elastomeric components such as ethylene copolymers, including ethylene-propylene copolymer and also preferably ethylene copolymers with higher alpha-olefins having from 6 to 12 carbon atoms. A particular preferred option is the inclusion of an ethylene-1-octene copolymer with a high ethylene content of preferably above 80-mol %. Such copolymers may be added in amounts of up to 15wt %, based on the overall weight of the composition, preferably up to 10 wt %. Commercially available examples of preferred ethylene copolymers are the polymers sold under the tradename ENGAGE by DuPont Dow, for example ENGAGE 8100, ENGAGE 8180, ENGAGE 8200, and ENGAGE 8400.

Examples of ethylene-propylene elastomers which can be employed are elastomers used as polyolefin modifiers, such as those sold under the DUTRAL trade name by Polimeri, i.e. ethylene-propylene elastomers with an MFR (230° C./5 kg) of from 1 to 5 g/10 min.

The composition of the invention may further comprise conventional additives, such as antioxidants, stabilizers, acid scavengers, clarifying agents, colouring agents, anti-UV agents, nucleating agents, antistatic agents and mould release agents. Typically, these additives may be present at less than 2 wt % each, more preferably less than 1 wt % relative to the total weight of the composition.

It is particularly preferred if fillers such as talc or nanofillers are present in the compositions of the invention. There can be up to 15 wt % of fillers present in the composition of the invention. The amount of filler present may range from 5 to 12 wt %. Ideally that filler is talc. It is preferred if no fillers are added.

Composition Properties

The overall composition of the invention (with any optional glass fibres present) may have an $MFR_{2/230}$ of 1 to 10 g/10 min.

The flexural modulus of the composition may be at least 900 MPa, preferably at least 1500 MPa.

The tensile strength is preferably at least 12 MPa, especially at least 25 MPa.

Charpy impact strength values are also high. Charpy impact strength values at 23° C. are preferably at least 20 $kJ/m^2$, especially at least 35 $kJ/m^2$.

Low temperature charpy impact strength (at −20° C.) may be at least 7 $kJ/m^2$.

The compositions of the invention also exhibit very high scratch resistance. This is measured on an injection moulded specimen of the composition described in detail below.

A part made of the polypropylene resin of the present invention has a high scratch resistance. When a part is scratched, especially a part containing a white filler like talc, a distinct scratch mark is visible on the part. Delta L is a measure of the change in lightness (determined using a spectralphotometer) and hence represents a measure of the obviousness of a scratch. High Delta L values represent a highly visible scratch. Typically scratches present as a white mark on a dark surface. Ideally, however, scratches on surfaces should not be visible. The lower the Delta L value the less visible the scratch is and hence the darker the scratch is. A negative delta L value is indicative of the scratch being essentially invisible to the eye. Measurements of Delta L are carried out using colorimetry.

It is preferred if the Delta L values achieved in the present invention are less than 0.7, especially less than 0.5. In some embodiments the Delta L value can be as low as 0.25 or less. In a highly preferred embodiment, the Delta L value is 0 or negative.

Delta L is measured as the difference in brightness between an untreated surface of the resin and a surface of the resin in which a cross hatch is cut with a distance between each grid line of 2 mm with a steel ball tip having a diameter of 1 mm, a cutting force of 10 N and a cutting speed of 1000 mm/min. Full details of the test procedure are provided in the examples which follow.

The composition of the invention also possess excellent touch and feel which we measure in terms of Shore D hardness. A composition with lower shore D values represents one with a softer feel and hence more velvet or silk like feel. This is important for many applications, e.g. for internal car parts where appearance and feel are vital in marketing a vehicle. Shore D values can be less than 50, preferably less than least 45.

The polypropylene composition of the invention is particularly useful in producing moulded and/or extruded articles by employing of conventional injection moulding, blow moulding and/or extrusion techniques.

Preferably, these articles are body parts for automotive applications, either exterior or interior parts. The exterior parts may be bumper covers, exterior fascia, air dams, and other trim, the interior parts dash boards, air bag covers and the like.

The invention will now be described with reference to the following non limiting examples.

Description of Measurement Methods

Melt Flow Rate ($MFR_2$)

The melt flow rates $MFR_2$ were measured under a load of 2.16 kg at 230° C. (for PP or PP-copolymers) and 190° C. (for PE), according to ISO 1133.

Density

Is measured using ISO1183.

Scratch Resistance

To determine the scratch resistance a Cross Hatch Cutter Model 420p, manufactured by Erichsen, was used.

Injection moulded specimen, 60*60 mm, 3 mm thickness, mass temperature: 240° C., tool-temperature: 40° C., back pressure: 600 bar A cross hatch (40×40 mm, distance between each grid line 2 mm) was cut onto the specimen surface with fine grain (VW K09-grain). The instrument is equipped with a steel ball tip (1.0 mm). The cutting force is 10 N. A cutting speed of 1000 mm/min is used.

Scratch evaluation was carried out by measuring the Delta L value by means of a spectral photometer acc DIN 5033 (CIE LAB, D65, 10°, 45/0). This measurement corresponds to the difference in brightness of the treated versus the untreated polymer surface. The change in brightness is expressed by the delta L value. A delta L<1.0 is considered as high scratch resistance and low scratch visibility respectively.

Notched Charpy Impact Strength

The notched Charpy impact strength measurement was carried out according to ISO 179/1 eA at 23° C. and −30° C. by using injection moulded test specimen (80×10×4 mm), moulded as described in EN ISO 1873-2.

Flexural modulus (strength/modulus/stress/strain) were determined according to ISO 178 using injection moulded test specimens 80×10×4 mm., moulded as described in EN ISO 1873-2

Tensile Properties:

Tensile properties (strength/modulus/stress/strain) were determined according to ISO 527 using injection moulded test specimens acc ISO 527/1B, moulded as described in EN ISO 1873-2 (170×10×4 mm).

Shore D

Shore D is determined acc. ISO868 on moulded specimen with a thickness of 4 mm. The shore hardness is determined after 15 sec after the pressure foot is in firm contact with the test specimen. The specimen were moulded acc. EN ISO 1873-2

EXAMPLES

The Polypropylene used in the Examples is SD233CF a very soft random heterophasic copolymer available from Borealis. It has an ethylene content of 8 wt %, $MFR_{(230/2.16)}$ of 7 g/10 min.

The ethylene methyl acrylate polymers used are Elvaloy grades available from DuPont. The grades employed are Elvaloy 1330, 1913 and 1609.

The acrylate content in these grades is given in the last two digits of the grade name (so 30 wt % for Elvaloy 1330, 13 wt % for Elvaloy 1913 and 9 wt % Elvaloy 1609).

The glass fibers employed were P968, supplied by OCV.

The compositions in Table 1 which follows also contained standard polymer additives namely 0.2% IRGANOX™ B225, 1% PLASBLACK™ 3638 (containing 40% carbon black), and 1% EXXELOR™ PO1020, but no talc. To sum to 100%, the additive amounts are deducted from the polypropylene fraction.

In the following examples, compositions were prepared using the components in the table below using a twin screw extruder with a temperature profile starting with 180° C., and using an extrusion temperature of 220° C. The glass fibres were added by a sidefeeder.

Table 1 provides details of the compositions produced and the properties thereof.

TABLE 1

| | Unit | CE1 | Ex 1 | Ex 2 | CE2 | CE3 | CE4 | CE5 |
|---|---|---|---|---|---|---|---|---|
| PP SD233CF | wt % | 80 | 40 | 60 | 40 | 60 | 40 | 60 |
| Ethylene methyl acrylate | wt % | 0 | 40 | 20 | 40 | 20 | 40 | 20 |
| EAA Grade | — | — | Elv. 1330 | Elv. 1330 | Elv.1913 | Elv.1913 | Elv. 1609 | Elv. 1609 |
| Glass Fibre contents | wt-% | 20 | 20 | 20 | 20 | 20 | 20 | 20 |
| MFR 230/2.16 | g/10 min | 2.9 | 4 | 3.1 | 4.56 | 3 | 4.25 | 2.95 |
| Tensile modulus | MPa | 2616 | 1109.2 | 2017.9 | 1420.5 | 2010.8 | 1464 | 2034.5 |
| Tensile strength | MPa | 39 | 14.3 | 27.9 | 15.4 | 25.9 | 17.3 | 26.3 |
| Tensile strain at tensile strength | % | — | 4.71 | 5.82 | 3.12 | 4.8 | 3.23 | 4.88 |
| Tensile stress at break | MPa | — | 2.1 | 20.1 | 0.6 | 6.8 | 0.2 | 6.4 |
| Tensile strain at break | % | — | 12.73 | 7.64 | 21.35 | 8.68 | 18.25 | 8.12 |
| Flexural modulus | MPa | 2172 | 1002.7 | 1667.9 | 1212.1 | 1753.3 | 1356.6 | 1822.5 |
| Flexural strength | MPa | — | 17 | 29.4 | 19.7 | 30.9 | 22.2 | 31.7 |
| Flexural strain at flexural strength | % | — | 5.3 | 5.8 | 4.3 | 5.4 | 4.1 | 5.2 |
| Flexural stress at 3.5% strain | MPa | — | 15.9 | 27.1 | 19.3 | 28.8 | 21.8 | 29.7 |
| Charpy Impact 23° C. | kJ/m$^2$ | 33.4 | 25.7 | 27.9 | 27 | 26.9 | 26 | 29.2 |
| Charpy Impact −30° C. | kJ/m$^2$ | 9.7 | 9.4 | 9.2 | 9.6 | 9.6 | 10.2 | 11 |
| Shore Hardness | None | — | 39.4 | 49.8 | 43.1 | 50.1 | 45.6 | 50.2 |
| Delta L (load 10 N) | None | 0.75 | −0.54 | −0.11 | 2.29 | 2.18 | 1.77 | 1.84 |

As can be seen, the use of Elvaloy 1330 (Ex 1 and 2) allows negative scratch resistances to be achieved. In contrast where acrylates with a lower acrylate content are used (CE2-CE5), the scratch resistance properties are worse than in the absence of the acrylate (CE1).

It will be noted that the addition of large amounts of the acrylate reduces tensile and flexural modulus and tensile strength. There is also a small reduction in ambient temperature impact strength. However, excellent scratch resistance and good mechanical properties are still present with 20 wt % of the EAA added.

The invention claimed is:

1. A composition comprising:
 (I) 30 to 85 wt. %, based on the weight of the composition, of a heterophasic polypropylene copolymer having a melt flow rate of 1 to 20 g/10 min;
 (II) 15 to 35 wt. %, based on the weight of the composition, of an ethylene-alkyl (meth)acrylate polymer consisting of ethylene and alkyl (meth)acrylate monomers, and having a (meth)acrylate content of at least 15 wt. %; and
 (III) 10 to 50 wt. %, based on the weight of the composition, of glass fibers.

2. The composition of claim 1, wherein polymer (II) is an ethylene-alkyl acrylate polymer.

3. The composition of claim 1, wherein polymer (II) is ethylene-methyl acrylate polymer.

4. The composition of claim 1, wherein the amount of acrylate comonomer within polymer (II) is in the range of 20 to 35 wt. %.

5. The composition of claim 1, comprising 15 to 35 wt. % of glass fibers.

6. The composition of claim 1, comprising 35 to 65 wt. % of polypropylene copolymer (I).

7. The composition of claim 1, comprising a Delta L value of less than 0.7.

8. A molded article, comprising a composition as claimed in claim 1.

9. A process for making a composition as claimed in claim 1 comprising obtaining a first component (I) comprising a polypropylene copolymer and blending said first component with a second component (II) comprising at least one ethylene alkyl (meth)acrylate polymer having a (meth)acrylate content of at least 15 wt. % and a third component (III) of glass fibers.

10. The composition of claim 1, comprising a Delta L value of less than 0.5.

* * * * *